Patented Mar. 1, 1938

2,110,109

UNITED STATES PATENT OFFICE 2,110,109

PRODUCTION OF BUTYL ALCOHOL AND ACETONE BY FERMENTATION

Elizabeth F. McCoy, Madison, Wis., assignor to Commercial Solvents Corporation, Terre Haute, Ind., a corporation of Maryland No Drawing. Application January 7, 1933, Serial No. 650,736

15 Claims. (Cl. 195—44)

My invention relates to the production of butyl alcohol and other valuable products by the fermentation of sugar-containing solutions. More specifically, my invention relates to the production of normal butyl alcohol, acetone, and ethyl alcohol by the fermentation of sugar solutions by means of bacteria designated herein as *Clostridium saccharo-acetobutylicum*.

It has previously been known that sugar solutions could be fermented by means of organisms of the *Clostridium butyricum* group with the production of various products such as acetic and butyric acids, butyl alcohol, etc. (see for example Bergey's Manual of Determinative Bacteriology, Williams & Wilkins Co., Baltimore, 1930, pages 434–5). However, the yields of butyl alcohol have in all cases been so low as to preclude commercial utilization of such fermentations. Therefore, in spite of the fact that crude sugar solutions represent the cheapest source of raw material, up to the present time the production of butyl alcohol has been accomplished only by the fermentation of starch mashes by organisms of the type *Clostridium acetobutylicum* (Weizmann).

The organisms of the *Clostridium butyricum* group have been reported in some instances to show low yields of solvents in addition to aliphatic acids. However, these organisms have never been shown to be fermenting agents of a commercial character, from the standpoint of solvent production. The solvent yields have always been extremely low and the highly acidic nature of the mashes has complicated the question of recovery of the products.

However, I have discovered a new group of organisms closely related to the *Clostridium butyricum* group, but distinguishable therefrom in a number of characteristics, particularly that of high solvent yields from sugar-containing mashes. This group of organisms, herein designated as *Clostridium saccharo-acetobutylicum*, is practically indistinguishable, morphologically, from the *Clostridium butyricum* group, but may readily be distinguished by the remaining Primary Characteristics of the Brief Characterization in the Descriptive Chart of the Society of American Bacteriologists. These Primary Characteristics are given below:

Primary characteristics

I. Microscopic features
  1. Form: rods
  2. Endospores oval; central to terminal
  3. Flagella: present
  4. Gram stain: young cultures—positive
     old cultures—negative II. Miscellaneous biochemical reactions
  1. Relation to oxygen: strictly anaerobic
  2. Gelatin liquefaction: negative
  3. Nitrate reduction: negative
  4. Chromogenesis: none to slight cream
  5. Products: butyl alcohol—above 64%, usually 68–73%
       acetone—above 18%, usually 26–32%
       ethyl alcohol—below 6%, usually 1–3%

III. Fermentation reactions
  1. Diastatic action: +
  2. Glucose fermentation: +++
  3. Lactose fermentation: ++
  4. Sucrose fermentation: +++
  5. Glycerol fermentation: —
  6. Soluble starch fermentation: ++
  7. Cereal mash fermentation: +
  8. Simple sugars fermentation: +++
     (— negative  ++ decided)
     (+ moderate  +++ abundant)

In view of the uncertainty in the literature as to methods utilized for the determination of certain of the characteristics referred to above, I believe it to be desirable to amplify somewhat the characteristics briefly outlined. For example, the microscopic features will be found to vary somewhat, depending upon the medium, age of the culture, and the conditions under which it has been grown. The characteristics described above refer to healthy cultures grown in a favorable medium and under favorable conditions. When grown at 28° C. in a sucrose medium containing suitable nutrients, the organisms will be found to be practically entirely of regular rod shape. The endospores will, in general, be found to be subterminal to terminal, but many of the central type may be found in any culture. The gram stain will usually be found to be as follows:

1 day: positive
2 days: positive, some negative
3 days: negative, some positive
4 days: negative.

The biochemical reactions described also refer to such reactions under favorable conditions. The term "strictly anaerobic", as used in the outline refers to the inability of the organisms to grow on the surface of nutrient glucose agar when incubated aerobically. The organisms are, however, capable of developing and producing satisfactory fermentation in deep liquid media when incubated aerobically, due to the anaerobic conditions maintained within the medium.

The negative gelatin liquefaction referred to in the outline was determined by the following tests: Tubes of plain gelatin, 0.25% glucose gelatin, and Bredemann's gelatin (Centr. für Bakt. I, O., 1909, 23, page 385), and the Frazier gelatin-agar plates (J. Infect. Dis. 1926, 39, page 302) were inoculated in duplicate and incubated at 28° C. The cultures were cooled daily to test for solidification and final tests were made at the end of 30 days. At the end of this period titratable acidity evidenced growth in all cases, but no liquefaction was observable. The trichloracetic acid test showed gelatin to be present in all cases and precipitation with tannic acid showed no change in the agar plates. A known gelatin liquefying organism tested at the same time showed complete liquefaction, negative tests with trichloracetic acid, and opaque halos on the plates when precipitated with tannic acid.

The nitrate reduction tests using the diagnostic media recommended in the Manual of Methods for Pure Culture Study (Committee on Bacteriological Technic, Society of American Bacteriologists, Geneva, New York) showed the organisms of this group to be unable to reduce nitrates.

The tests for chromogenesis will, of course, depend to some extent upon the medium and conditions, but in most laboratory media only a slight cream color, if any, will be found to develop.

The fermentation reactions referred to in the outline were also determined under favorable conditions and with young healthy cultures. The diastatic action reported as positive refers to the ability to partially liquefy corn mash and potato mash. These cultures will usually be found to ferment both corn mash and potato mash, preferably the latter, but only to a limited extent. Finished fermentations of this type have a clear liquid layer above a much larger amount of undigested material than is found in the case of similar fermentations by *Clostridium aceto-butylicum* (Weizmann). Although these organisms possess diastatic power, and give appreciable yields of solvents from starch when tested in media providing other suitable nutrients, the yields from mashes consisting solely of grain-meal and water are so low as to preclude the commercial utilization of such mashes.

The fermentation reactions for glucose, lactose, sucrose, and glycerol, referred to in the outline, were determined by the standard procedure of measuring the gas produced in a culture under a vaseline seal and determining the titratable acidity at the completion of the fermentation. The glucose, lactose, and sucrose tests are clear-cut in all cases. The glycerol test, on the other hand, might be subject to some misinterpretation. In the tests on which this negative fermentation characteristic is reported, some gassing occurred and the gas and acidity produced was in some cases slightly greater than that of the control. This might be reported by some investigators as a positive test, but in view of the large differences between such results and those of the fermentations of the common sugars, this has been designated as a negative test for purposes of definition in the present specification.

The primary characteristics, discussed above, together with the outstanding characteristic of the production of good yields of solvents from sugar-containing mashes, clearly differentiate this group of organisms from any of the prior art bacteria. It is therefore to be understood that when the term "*Clostridium saccharo-acetobutylicum*" is used in the present specification and in the claims, I refer to the group of organisms having the characteristic of producing good yields of acetone and butyl alcohol from sugar-containing mashes and having the primary characteristics as outlined and discussed in the paragraphs following the outline. It may be further pointed out that among the primary characteristics referred to, a combination of five of them constitutes the outstanding differentiation of this group of organisms from the prior art bacteria, so that this group may be briefly characterized by the following properties:

1. Ability to produce good yields of acetone and butyl alcohol from sugar-containing mashes.
2. Inability to produce good yields of acetone and butyl alcohol from mashes consisting solely of grain-meal and water.
3. Inability to liquefy gelatin.
4. Inablity to reduce nitrates.
5. Inability to ferment glycerol.

It is to be understood, of course, that aside from the primary characteristics discussed above, the members of this group may differ considerably in minor points. For example, among eight cultures of this group, isolated from soil, one was found to differ from the others in the fermentation of xylose and arabinose and another was found to differ in the fermentation of erythritol. My invention, therefore, includes within its scope all such cultures, having the characteristics defined above, irrespective of differences in minor characteristics.

Although the present invention includes within its scope all members of the group *Clostridium saccharo-acetobutylicum*, I prefer to utilize one member of this group designated herein as *Clostridium saccharo-acetobutylicum-α*. This organism is described below according to the Descriptive Chart of the Society of American Bacteriologists:

Name of organism: *Clostridium saccharo-acetobutylicum-α*.

Source: Soil.
I. Morphology.
  1. Vegetative cells.
    Medium used: Speakman's medium (J. of Biol. Chem. 1923–24, 58, page 395), 18–24 hours at 30° C.
    Stain used: negative nigrosin, without heat.
    Form: short and long rods.
    Arrangement: single and chain.
    Limits of length: 2.8–5.0$\mu$; of diameter 1.0–1.3$\mu$.
    Size of majority: 3.7×1.1$\mu$.
    Ends: rounded.
  2. Sporangia: present.
    Medium used: Speakman's medium.
    Form: spindle shape, club-shaped.
  3. Endospores: present.
    Medium used: beef-peptone-glucose agar.
    Stain used: Dorner's spore stain.
    Location of endospores: central to terminal.
    Form: oval.
  4. Motility.
    In broth: ++.
    On agar: ++.

5. Flagella: present.
   Attachment: peritrichiate.
   Stain used: Plimmer-Paine.
6. Irregular forms: present; more often in old cultures.
7. Staining reactions.
   Gram stain:
   1 day: positive.
   2 days: positive, some negative.
   3 days: negative, some positive.
   4 days: negative.
   Iodine stain: young vegetative cells stain yellow; granulose in clostridia at 48 hours stains blue-violet.

II. Cultural characteristics.
1. Agar colonies.
   Medium used: 0.25% glucose-beef-peptone agar.
   Growth: slow.
   Form: circular.
   Surface: smooth.
   Elevation: slightly raised.
   Edge: entire.
   Internal structure: finely granular.
   Chromogenesis: slight cream yellow.
2. Potato slant.
   Temperature: 28° C.
   Aerobic growth: none.
   Anaerobic growth: moderate.
   Form of growth: spreading—probably due to condensation moisture or manner of spreading inoculum.
   Elevation: raised.
   Luster: glistening.
   Surface: smooth to contoured.
   Optical character: opaque.
   Chromogenesis: cream.
   Odor: butyrous.
   Consistency: slimy.

III. Physiology.
1. Temperature relations.
   Fermentation temperature range: 24–40° C.
2. Relation to reaction of medium.
   Fermentation pH range: 4.0–7.0.
3. Chromogenesis.
   Nutrient agar: none to slight cream.
   Potato: cream.
4. Production of indole.
   Medium used: glucose-peptone.
   Tests used: Salkowski and Ehrlich tests.
   Indole: absent at 3 and 5 days.
5. Production of hydrogen sulphide.
   Medium used: glucose lead acetate agar.
   Hydrogen sulphide: absent.
6. Relation of oxygen.
   Medium used: glucose-beef-peptone agar.
   Aerobic growth: absent.
   Anaerobic growth: moderate.
7. Litmus milk.
   Reaction: acid.
   Curd: soft to firm acid curd; moderately gassy.
   Peptonization: none to very slight.
   Reduction of litmus: reduced prior to curd formation; reoxidized by atmosphere above medium.
8. Nitrate reduction.
   Medium used: nitrate-peptone broth.
   Test used: α-naphthylamine-sulfanilic acid.
   Nitrite: absent.
9. Fermentation reactions.
   Medium used: Speakman's medium (loc. cit.).
   Incubation temperature: 28° C.
   Age: 7 days.
   Method of observation: total gas production and titratable acidity.

| Carbohydrate | ° Fermentation |
|---|---|
| Arabinose | ++ |
| Xylose | ++ |
| Rhamnose | − |
| Glucose | +++ |
| Galactose | ++ |
| Mannose | +++ |
| Levulose | ++ |
| Sucrose | +++ |
| Maltose | +++ |
| Lactose | ++ |
| Melezitose | ++ |
| Soluble starch | ++ |
| Grain mash | + |
| Dextrin | ++ |
| Inulin | +++ |
| Glycogen | ++ |
| α-Methyl glucoside | +++ |
| Salicin | ++ |
| Glycerol | − |
| Mannitol | +++ |
| Sorbitol | ++ |
| Erythritol | − |
| Quercitol | − |
| Cellulose | − |

− negative; + moderate; ++ decided; +++ abundant.

It is known to those skilled in the art that many of the characteristics included in the above descriptive chart are variable and that different results may be obtained by only slight changes in the media, age of culture, or fermentation conditions. This chart, therefore, is included herein as an aid in identification of the bacteria and not as an absolute limitation. I believe that with the aid of the general outline previously given and the above descriptive chart, one skilled in the art can readily identify *Clostridium saccharo-acetobutylicum-α* with certainty in spite of slight variations in the minor characteristics of the chart. In any event, a check can be obtained by testing the culture at different intervals and under slightly different fermentation conditions noting the characteristics which appear most consistently.

The organisms of the group *Clostridium saccharo-acetobutylicum* and the specific organism *Clostridium saccharo-acetobutylicum-α* are quite widely distributed in nature and may readily be isolated from such various sources as soil, rotted wood, grain, corn stalks, and the like. Soils of various types have been found to consistently yield active cultures of organisms of this group. In view of the characteristics listed above, it is believed that one skilled in the art may readily isolate these organisms from such sources by known means of isolation for anaerobic bacteria. Of course, as is apparent to one skilled in the art, these organisms cannot be isolated from every sample of material tested. However, if a number of different materials are tried, a good culture will nearly always be secured. The following specific example is given as illustrative of one of the methods applicable to this purpose:

Soil extracts (50 grams of each soil in 200 cc. of water) are pasteurized twenty minutes at 80° C. and 5 cc. portions used to inoculate Winogradsky's medium (Centr. für Bakt. II. Abt. 1902, 9, 3) in deep bottles. These cultures are incubated at 28° C. and when active fermentation is evidenced, transfers are made to tubes of the same medium. Several, i. e., six or seven, successive pasteurizations and incubations in deep layers of the same medium are then made, and at this point a microscopic examination should show gram positive clostridia predominating, with possibly some aerobic spore-formers present. At this point a series of transfers may be made in liquid medium, e. g. Speakman's medium (loc. cit.) containing crystal violet in concentrations of 1:50,000 to 1:100,000 for the purpose of eliminating the aerobic organisms. The cultures may then be plated in deep agar plates. For this purpose about 30–35 cc. of glucose-beef-peptone agar per plate is inoculated with a pasteurized spore suspension of the culture to be purified. The plates are incubated at 28° C. under anaerobic conditions, e. g., in anaerobic potato jars. After 36–48 hours, small colonies should be present. After microscopic examination, deep colonies which appear to be well isolated are transferred to tubes of liquid medium. At this point, or previous to the plating if desired, quantitative tests for solvent production may be made. When an active solvent-producing culture is secured, a series of replatings should be carried out to assure purity of the culture.

It is to be understood, of course, that the above isolation procedure is merely illustrative and that my invention is not to be limited to any particular method employed. My invention includes within its scope organisms having the characteristics previously described, irrespective of their source or the means employed for their isolation.

In carrying out my invention, various sources of carbohydrates may be employed, but I prefer to use simple sugars as the principal source of fermentation carbohydrate. By the term "simple sugars", as used here and in the claims, is meant the common monohexoses and disaccharides such as glucose, levulose, maltose, sucrose, and similar fermentable carbohydrates in these groups. As sources of such materials, there may be employed crude commercial materials such as cane molasses (black strap), beet molasses, hydrol (the mother liquor from the crystallization of corn sugar), and the like. Of course, other fermentable carbohydrates, such as those illustrated in the fermentation characteristics discussed above, may also be employed, or mixtures of various types of carbohydrates may be used. For example, a corn syrup containing glucose and dextrin may be found to be quite satisfactory for this fermentation, and even mixtures of grain mashes and simple sugars will be found to give fair yields of solvents.

When carrying out fermentations of commercial mashes, e. g., molasses mashes, with bacteria of the *Clostridium saccharo-acetobutylicum* group, the solvents produced will be found to be generally within the following ranges:

Butyl alcohol_____ above 64%; usually 68–73%
Acetone_____ above 18%; usually 26–32%
Ethyl alcohol_____ below 6%; usually 1–3%

The gaseous products of the fermentation, carbon dioxide and hydrogen, will generally be found to be in the order of magnitude: $CO_2/H_2$ (by volume) = 2/1.

The method for carrying out this invention may perhaps be best illustrated by the following specific examples:

*Example I*

A 7% molasses solution was prepared and sterilized. This mash was then inoculated with about 3.5% by volume of the second generation of a culture of *Clostridium saccharo-acetobutylicum* isolated from soil, and maintained at a fermentation temperature of 28° C. At the completion of the fermentation, an analysis showed a concentration of solvents of 5.91 grams per liter.

*Example II*

A mash containing 3.35% sugar in the form of Cuban molasses, 0.27% of gluten meal, and 0.027% of $(NH_4)_2SO_4$ was adjusted to a pH of 5.73, sterilized, inoculated with a culture of *Clostridium saccharo-acetobutylicum-α* and maintained at a fermentation temperature of 30° for 72 hours. An analysis of the fermented mash showed a concentration of solvents of 7.83 grams per liter, corresponding to a yield of 22.4% calculated on the weight of the sugar in the original mash. The solvent ratio was found to be as follows:

| Acetone | Ethyl alcohol | Butyl alcohol |
| --- | --- | --- |
| Percent 22.8 | Percent 4.3 | Percent 72.9 |

It is to be understood, of course, that my invention is not to be limited to the specific examples or conditions outlined above. Known fermentation procedures may be employed, and such mashing or fermenting procedures as would naturally occur to one skilled in the art are included within the scope of this invention. For example, if the carbohydrate source fails to supply sufficient available nitrogenous material, or the necessary mineral elements such as phosphates and the like, commonly known nutrients may be added to the mash to make up for any such deficiencies. The initial hydrogen ion concentration of the mash may be adjusted to the optimum requirement for the particular culture chosen, but for most purposes may be adjusted to a pH of 7 or somewhat below. The temperature for the fermentation may likewise be adjusted to the optimum for the particular culture used, but in general, a temperature of about 30° C. will be found to be satisfactory. In general, any modifications of procedure or the use of any equivalents which would naturally occur to one skilled in the art are to be understood as included within the scope of my invention.

Now, having fully described my invention, what I claim is:

1. In a process for the production of n-butyl alcohol and acetone by fermenting a carbohydrate mash by means of butyl alcohol producing bacteria, the improvement which comprises subjecting said mash to the action of bacteria herein described and designated as *Clostridium saccharo-acetobutylicum*.

2. A process for the production of n-butyl alcohol and acetone by fermentation which comprises inoculating a molasses mash with a culture of bacteria herein described and designated as *Clostridium saccharo-acetobutylicum*, and allowing fermentation to proceed.

3. In a process for the production of n-butyl alcohol and acetone by fermenting a carbohydrate mash by means of butyl alcohol producing bacteria, the improvement which comprises subjecting said mash at temperatures of 24° C. to 40° C. to the action of bacteria herein described and designated as *Clostridium saccharo-acetobutylicum*.

4. In a process for the production of n-butyl alcohol and acetone by fermenting a carbohydrate mash by means of butyl alcohol producing bacteria, the improvement which comprises subjecting said mash at a temperature of approximately 30° C. to the action of bacteria herein described and designated as *Clostridium saccharoacetobutylicum*.

5. A process for the production of n-butyl alcohol and acetone by fermentation which comprises inoculating a molasses mash with a culture of bacteria herein described and designated as *Clostridium saccharo-acetobutylicum*, and allowing fermentation to proceed at a temperature of approximately 30° C.

6. In a process for the production of n-butyl alcohol and acetone by fermenting a carbohydrate mash by means of butyl alcohol producing bacteria, the improvement which comprises subjecting said mash to the action of bacteria herein described and designated as *Clostridium saccharoacetobutylicum-α*.

7. A process for the production of n-butyl alcohol and acetone by fermentation which comprises inoculating a molasses mash with a culture of bacteria herein described and designated as *Clostridium saccharo-acetobutylicum-α*, and allowing fermentation to proceed.

8. In a process for the production of n-butyl alcohol and acetone by fermenting a carbohydrate mash by means of butyl alcohol producing bacteria, the improvement which comprises subjecting said mash at temperatures of 24° C. to 40° C. to the action of bacteria herein described and designated as *Clostridium saccharo-acetobutylicum-α*.

9. In a process for the production of n-butyl alcohol and acetone by fermenting a carbohydrate mash by means of butyl alcohol producing bacteria, the improvement which comprises subjecting said mash at a temperature of approximately 30° C. to the action of bacteria herein described and designated as *Clostridium saccharoacetobutylicum-α*.

10. A process for the production of n-butyl alcohol and acetone by fermentation which comprises inoculating a molasses mash with a culture of bacteria herein described and designated as *Clostridium saccharo-acetobutylicum-α*, and allowing fermentation to proceed at a temperature of approximately 30° C.

11. In a process for the production of n-butyl alcohol and acetone by fermenting a carbohydrate mash by means of butyl alcohol producing bacteria, the improvement which comprises subjecting said mash to the action of bacteria identifiable as *Clostridium saccharo-acetobutylicum* by means of the hereindescribed primary characteristics.

12. A process for the production of n-butyl alcohol and acetone by fermentation which comprises inoculating a molasses mash with a culture of bacteria identifiable as *Clostridium saccharoacetobutylicum* by means of the hereindescribed primary characteristics, and allowing fermentation to proceed.

13. In a process for the production of n-butyl alcohol and acetone by fermenting a carbohydrate mash by means of butyl alcohol producing bacteria, the improvement which comprises subjecting said mash at temperatures of 24° C. to 40° C. to the action of bacteria identifiable as *Clostridium saccharo-acetobutylicum* by means of the hereindescribed primary characteristics.

14. In a process for the production of n-butyl alcohol and acetone by fermenting a carbohydrate mash by means of butyl alcohol producing bacteria, the improvement which comprises subjecting said mash at a temperature of approximately 30° C. to the action of bacteria identifiable as *Clostridium saccharo-acetobutylicum* by means of the hereindescribed primary characteristics.

15. A process for the production of n-butyl alcohol and acetone by fermentation which comprises inoculating a molasses mash with a culture of bacteria identifiable as *Clostridium saccharoacetobutylicum* by means of the hereindescribed primary characteristics, and allowing fermentation to proceed at a temperature of approximately 30° C.

ELIZABETH F. McCOY.